United States Patent
Boxsell

(10) Patent No.: US 7,412,798 B2
(45) Date of Patent: Aug. 19, 2008

(54) ATTACHMENT TO A HYDROPONIC CONDUIT

(75) Inventor: Desmond James Boxsell, 301 Leacroft Street, Burbank, Queensland, 4156 (AU)

(73) Assignees: Desmond James Boxsell, Burbank, Queensland (AU); Lynetter Mavis Boxsell, Burbank, Queensland (AU)

( * ) Notice: Subject to any disclaimer, the term of this patent is extended or adjusted under 35 U.S.C. 154(b) by 186 days.

(21) Appl. No.: 10/483,996

(22) PCT Filed: Jul. 25, 2002

(86) PCT No.: PCT/AU02/00989

§ 371 (c)(1), (2), (4) Date: Sep. 14, 2004

(87) PCT Pub. No.: WO03/009672

PCT Pub. Date: Feb. 6, 2003

(65) Prior Publication Data

US 2005/0005512 A1  Jan. 13, 2005

(30) Foreign Application Priority Data

Jul. 26, 2001  (AU) .................................... PR 6643

(51) Int. Cl.
*A01G 31/06*   (2006.01)

(52) U.S. Cl. .......................................................... 47/39

(58) Field of Classification Search ................ 47/59 R, 47/60, 62, 63, 1.01, 39; D11/143, 145, 156
See application file for complete search history.

(56) References Cited

U.S. PATENT DOCUMENTS

| 1,451,515 | A |   | 4/1923  | Niemczewski |
|-----------|---|---|---------|-------------|
| 1,487,231 | A | * | 3/1924  | George ........................... 47/39 |
| 2,189,510 | A | * | 2/1940  | Swaney .......................... 47/63 |
| 2,781,651 | A | * | 2/1957  | Cutler .................... 248/346.11 |
| 2,815,606 | A | * | 12/1957 | Quackenbush ............. 47/41.12 |
| 4,310,990 | A | * | 1/1982  | Payne .......................... 47/59 R |
| 4,407,092 | A | * | 10/1983 | Ware .............................. 47/64 |
| 4,765,360 | A | * | 8/1988  | Baird .......................... 137/312 |
| 5,054,233 | A | * | 10/1991 | Evans .......................... 47/62 R |
| 5,228,235 | A | * | 7/1993  | Ishimoto ........................ 47/60 |

(Continued)

FOREIGN PATENT DOCUMENTS

JP   11332709 A  * 12/1999

(Continued)

OTHER PUBLICATIONS

Derwent Abstract Accession No. 91-293834/40, SU 1505035 A (Agric Phys Res Inst) Nov. 15, 1990.

*Primary Examiner*—Francis T Palo
(74) *Attorney, Agent, or Firm*—Hoffman, Wasson & Gitler

(57) ABSTRACT

A hydroponic conduit can be converted to drainage conduit by providing an attachment on which a plant container can be supported. The attachment comprises a circular plate on which the plant containers sits, drainage means (ribs, grooves etc.) and a central aperture in the circular plate to allow water to drain from the circular plate, and a short collar or spout on the bottom of the circular plate which passes into an opening in the hydroponic conduit to allow water to drain into the conduit. A second support means can be provided which is attached to the hydroponic conduit and which provides additional support to the attachment.

10 Claims, 8 Drawing Sheets

U.S. PATENT DOCUMENTS

| | | | | |
|---|---|---|---|---|
| 5,269,094 A | * | 12/1993 | Wolverton et al. | 47/66.6 |
| 5,394,647 A | * | 3/1995 | Blackford, Jr. | 47/62 A |
| 5,502,923 A | * | 4/1996 | Bradshaw | 47/62 A |
| 5,645,103 A | * | 7/1997 | Whittaker | 137/312 |
| 5,819,469 A | | 10/1998 | Hsu | |
| 6,149,119 A | * | 11/2000 | O'Connell | 248/545 |
| 6,219,966 B1 | * | 4/2001 | Lapointe et al. | 47/62 C |
| 6,247,268 B1 | * | 6/2001 | Auer | 47/62 R |
| 6,336,292 B1 | * | 1/2002 | Boxsell | 47/62 C |
| 6,412,740 B1 | * | 7/2002 | Rush et al. | 248/312.1 |
| 6,574,917 B2 | * | 6/2003 | Boxsell | 47/62 C |
| 6,678,997 B1 | * | 1/2004 | Howe | 47/65.5 |
| 6,843,021 B1 | * | 1/2005 | Huang | 47/63 |
| 7,069,691 B2 | * | 7/2006 | Brooke et al. | 47/59 R |
| 2005/0005512 A1 | * | 1/2005 | Boxsell | 47/39 |

FOREIGN PATENT DOCUMENTS

| | | | |
|---|---|---|---|
| JP | 2000005007 A | * | 1/2000 |
| JP | 2005224574 A | * | 8/2005 |
| WO | WO 83/01888 | | 6/1983 |
| WO | WO83/01888 | * | 6/1983 |

* cited by examiner

ATTACHMENT TO A HYDROPONIC CONDUIT

FIELD OF THE INVENTION

This invention is directed to an attachment that can be fitted to hydroponic conduit to improve the versatility of the conduit. In one form, the attachment can allow a plant container such as a plant pot or a planter bag to be supported on the conduit such that any water/nutrient mixture passing through the pot or bag will pass into the conduit.

BACKGROUND ART

Hydroponics involves growing plants in the absence of soil. Typically, the required nutrient and water is delivered to the plant root system in the form of an aqueous nutrient solution that passes over the root ball of the plant. Hydroponic techniques have certain advantages over more conventional agriculture that includes the ability to carefully control optimum feeding, the elimination of weeds, and improved control of pests and diseases.

Typically, a channel or conduit is provided through which the nutrient solution passes. The channel or conduit may comprise a closed pipe or tube, a closed channel or drain and the like. If a pipe or tube is provided, this may have various shapes including circular, oval, rectangular, square, irregular configurations and the like. The pipe or tube may be formed of a semirigid material such as PVC plastic, or may be formed from a very flexible plastic bag-like material. If the material is very flexible, it is generally required to fill the bag with a medium other than soil. These mediums can include sand, gravel, fibre mediums and the like. The medium will provide dimensional stability to the bag, but can interfere with flow-through of nutrient solution and the like. Therefore, it is generally preferable to have a semi rigid conduit typically formed of polyvinyl chloride, such that a growing medium is not required to provide shape and stability to the conduit.

Earlier filed USA patent application 09/196638 has matured into U.S. Pat. No. 6,336,292, granted Jan. 8, 2002, to Desmond J. Boxsell. Such patent describes an elliptical conduit for use with a hydroponic apparatus. The elliptical conduit provides an ideal cross-section for root growth that was similar to normal root growth in soil. It was found that the elliptical conduit provides a faster and better growth of plants.

Some plants are best grown in pots or planter bags as opposed to in a hydroponic system. For instance, the plant might be too large to grow properly in a hydroponic system. Alternatively, the plant may not be suited for growing in a medium devoid of soil. A disadvantage of growing and maintaining plants in pots or planter bags is in dealing with the used water that drains from the pot or bag. In some countries, this water can contaminate aquifers, creeks, streams and rivers. In other countries, water is precious and should not be merely drained away. Many countries have introduced legislation to penalise growers who contaminate ground water with run-off.

A hydroponic system efficiently reuses and recycles water. Therefore, there would be an advantage if part of a hydroponic system could be used for plants grown in pots or planter bags.

OBJECT OF THE INVENTION

The present invention is directed to an attachment or assembly that can be attached to a hydroponic conduit and which can support a plant container such as a plant pot or planter bag. The attachment or assembly can be designed to drain any water into the hydroponic conduit. In this manner, water is not lost from the system and does not contaminate aquifers, creeks, streams and the like. The water can also be reused. When not required, the attachment or assembly can be simply removed from the hydroponic conduit to allow plants to be grown in a hydroponic manner.

It is an object of the invention to provide an attachment to a hydroponic conduit and which may overcome at least part of the abovementioned disadvantages and/or provide the public with a useful or commercial choice.

In one form, the invention resides in an attachment for a hydroponic conduit of the type which has an at least partially rigid wall, the attachment comprising a support means to support a plant container and the like, drainage means adapted to collect water passing out of the container, and communication means to communicate the water from the drainage means into the hydroponic conduit.

In this manner, the attachment can be used to "convert" the hydroponic conduit from a pure hydroponic system into a water recovery, recirculation and reuse system.

Suitably, the hydroponic conduit is provided with at least one, and typically a plurality, of openings. These openings are typically substantially linearly aligned along a top of the hydroponic conduit and function to allow plants to grow through the openings using hydroponic techniques. Such hydroponic conduit is known. The conduit typically comprises a rigid or substantially rigid tube. The tube may have any suitable length and can have lengths of between 1-6 m or more. The tube may have various cross sections, and typical cross sections include circular, oval, and various channel shaped cross sections. A known type of tube is formed from PVC having a wall thickness of between 1-5 mm. The tube is provided with a number of cutouts or openings that are usually round and extend along an upper wall of the tube, with openings being in linear alignment. The spacing between the openings can vary (depending on the plant size etc.) but is typically between 10-30 cm. The opening has a diameter or cross-section that can vary (again depending on the plant size and plant type) but is typically between 2-10 cm. As mentioned above, the precise type of hydroponic conduit need not form part of the invention except that it is used as a support for the attachment that does form part of the invention.

The attachment has a support means that is adapted to support a plant. As the plant is typically provided in a plant pot, planter bag, or some other type of plant container, this support means should be designed to provide support for this type of article. A simple type of support means comprises a substantially flat platform or tray on which the plant pot or other container can be placed. However, other types of support means are envisaged including support means which support the container against tipping, support means which can hold the container in a particular orientation, angle, height and the like. The support means may grip the side of the container, support the container via the rim of the container, or simply provide a platform on which the container can be placed.

The attachment has a drainage means to collect water passing from the plant container. In a simple form of the invention, the support means and the drainage means may be at least partially combined, and may form a drainage tray which supports the plant container on top of the tray, and also drains water which passes from the plant container.

The drainage tray may have various shapes and sizes. A preferred shape will be circular or substantially circular, as most plant pots or planter bags are substantially circular.

However, the drainage tray may also have shapes other than circular including rectangular and the like.

The drainage tray should be made of material which is strong enough to support a plant container, and should preferably be made of material which is resistant to corrosion, rusting, rotting, cracking and the like. A suitable material would include plastics, although the drainage tray is not to be limited to merely plastic material.

The size of the drainage tray may vary depending on various factors. For instance, the drainage tray should be sufficiently large to support a common size/shape of plant container, or perhaps even a number of plant containers. However, as it is envisaged that a number of such attachments may be provided along the hydroponic conduit, the drainage tray should not be so large that it will interfere with adjacent attachments, or prevent the required number of attachments being placed on a single length of hydroponic conduit. Thus, a cross-section size of between 10-50 cm for the drainage tray is envisaged, with a preferred size being between 20-30 cm.

The drainage means may be configured to promote water flow to a particular part of the drainage means. For instance, the drainage means may be slightly dish shaped to promote water flow to the central portion of the drainage means. Of course, the drainage means may also be otherwise configured to promote water flow over a particular edge region, or towards some other part of the drainage means. If desired, the drainage means can be provided with a peripheral lip or flange, or an upstanding ridge or barrier to promote water flow into a desired direction/area. The drainage means can also be provided with one or more ribs, projections and/or one or more grooves, gutters, channels and the like to facilitate water flow into a desired direction/area. In a preferred embodiment, the drainage means comprises a circular drainage tray provided with an upstanding peripheral lip, and where the drainage tray tapers slightly towards a central aperture such that water will flow towards and through the central aperture.

The attachment includes a communication means to communicate water from the drainage means into the hydroponic conduit. Typically, the hydroponic conduit is provided with one or more openings (normally used to grow plants in a hydroponic manner) and through which water can pass. Thus the communication means can function to pass water from the drainage means, and through the opening into the hydroponic conduit. In a simple form, the communication means may comprise a pipe or tube that may be attached to, or form part of the drainage means and which passes through the opening in the hydroponic conduit. The pipe or tube may comprise a collar on the underside of the drainage tray. Suitably, the collar is designed to allow a plurality of trays to nest into each other to economize on packaging and transportation.

To provide stability and rigidity to the attachment, a second support means may be provided. The second support means can function to assist in supporting the drainage means and/or the support means (which supports the plant container) onto the hydroponic conduit.

The second support means may comprise a substantially flat platform having attachment means to enable the second support means to be attached to the hydroponic conduit. The attachment means may comprise hooks, claws, straps, fasteners or any other type of suitable attachment means. It is preferred that the attachment means allows the second support means to be releasably attached to the conduit.

The substantially flat platform may be provided with an opening through which the pipe or tube can pass. The opening is typically defined by a collar that provide support to the pipe or tube, thereby providing support to the drainage tray/support means.

BRIEF DESCRIPTION OF THE DRAWINGS

An embodiment of the invention will be described with reference to the following drawings in which.

BEST MODE

Figure 1:
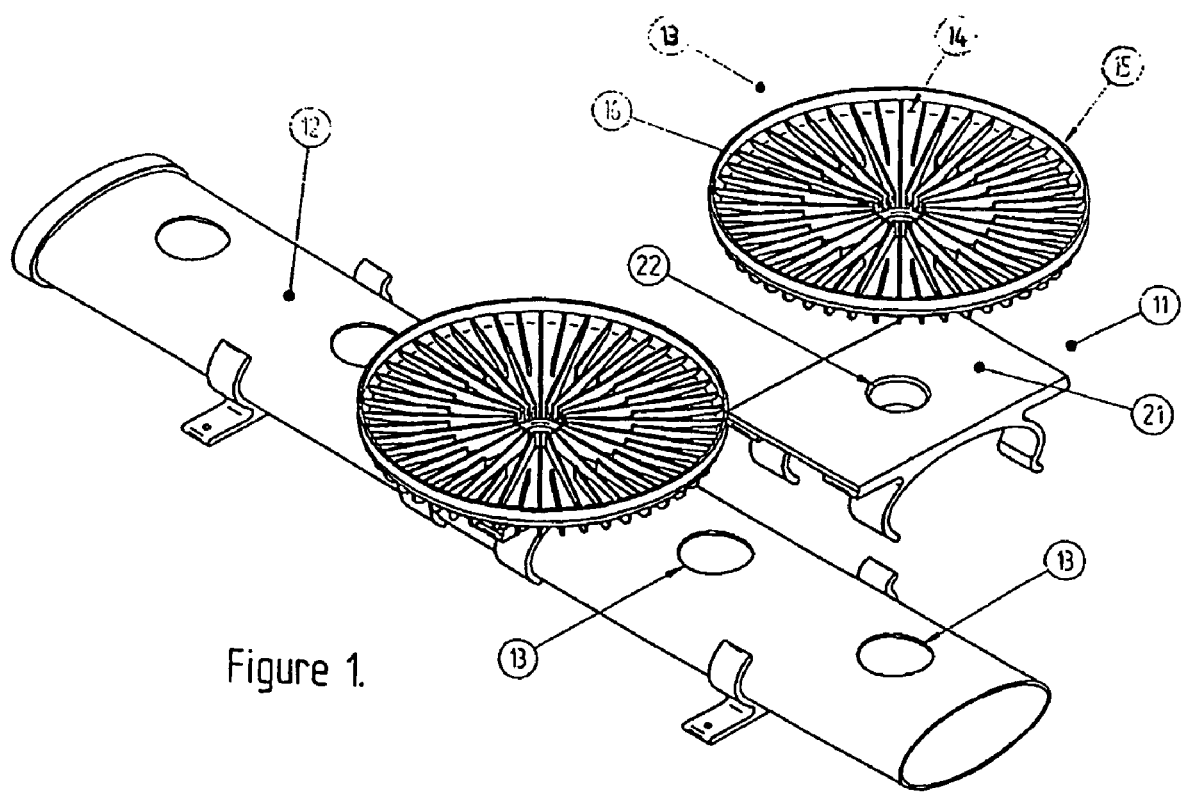
FIG. 1. Illustrates the separate components of an attachment according to an embodiment of the invention.

Referring to the figures, and initially to FIG. 1, there is illustrated an attachment according to an embodiment of the invention which comprises two parts being a combined support means/drainage means 10, and a second support means 11, with FIG. 1 additionally illustrating part of a hydroponic conduit 12.

Referring initially to hydroponic conduit 12, this conduit is known and in the embodiment comprises an oval PVC pipe of any suitable length. The conduit 12 is provided with a number of spaced apart linearly aligned circular openings 13 which are used to grow plants in a hydroponic manner. Of course, although conduit 12 is described as a hydroponic conduit, a pipe or tube or similar conduit could also be used which need not be used only for hydroponic systems.

Figure 4:
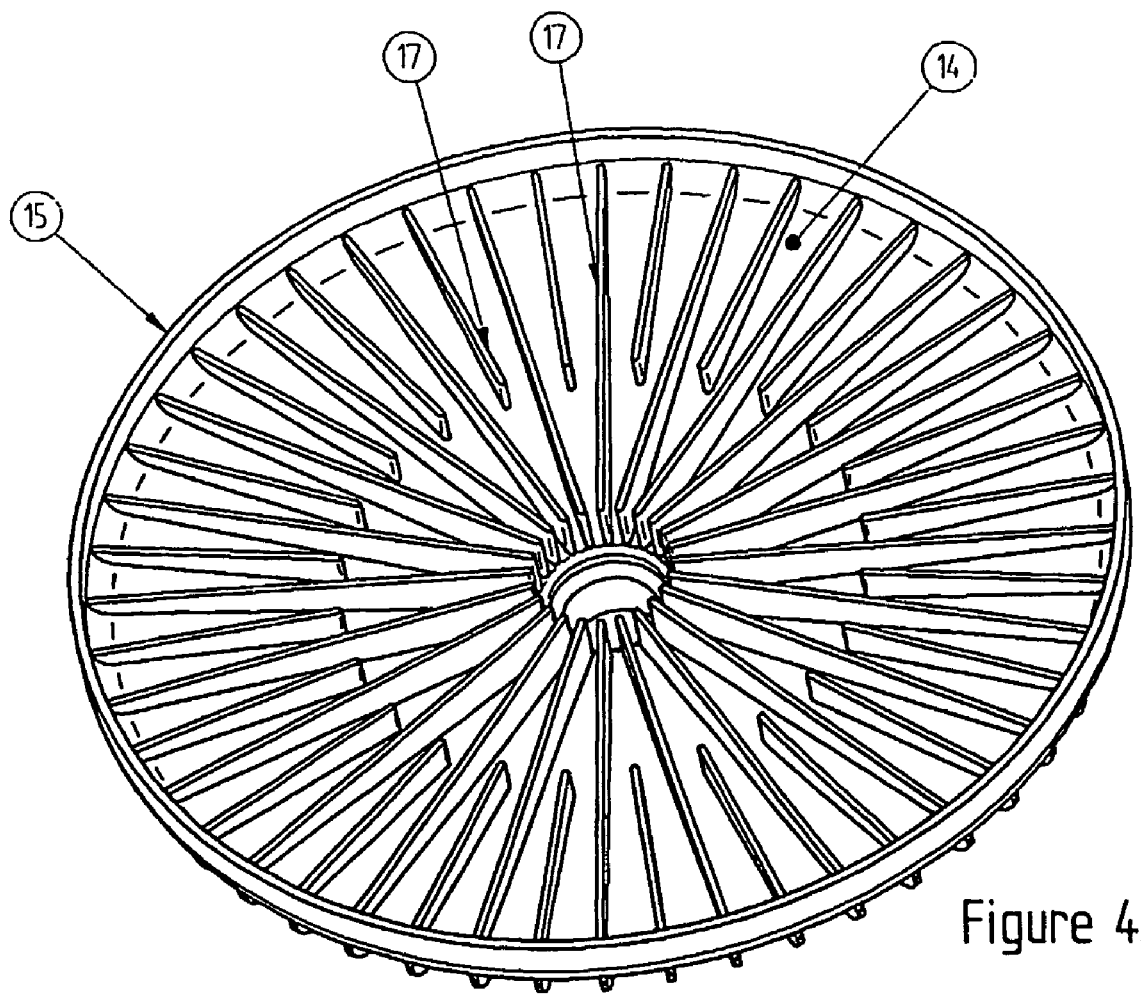
FIG. 4. Illustrates a plan view of the support means/drainage means.

The combined support means/drainage means 10 comprises a substantially flat circular drainage tray 14 having a diameter of between 25-40 cm, and being provided with an upright peripheral lip 15. The drainage tray 14 is slightly concave or tapered towards a central aperture 16. The shaping is to ensure that water will flow from any part of drainage tray 14 through central aperture 16. Drainage grooves or channels 17 (best illustrated in FIG. 4) extend radially from central aperture 16 to the peripheral lip 15. The drainage grooves function to allow water to drain from underneath a plant container.

Drainage tray 14 is formed of strong stout plastic material that does not bend, crack, sag or otherwise deform under the weight of a plant container.

Figure 2:
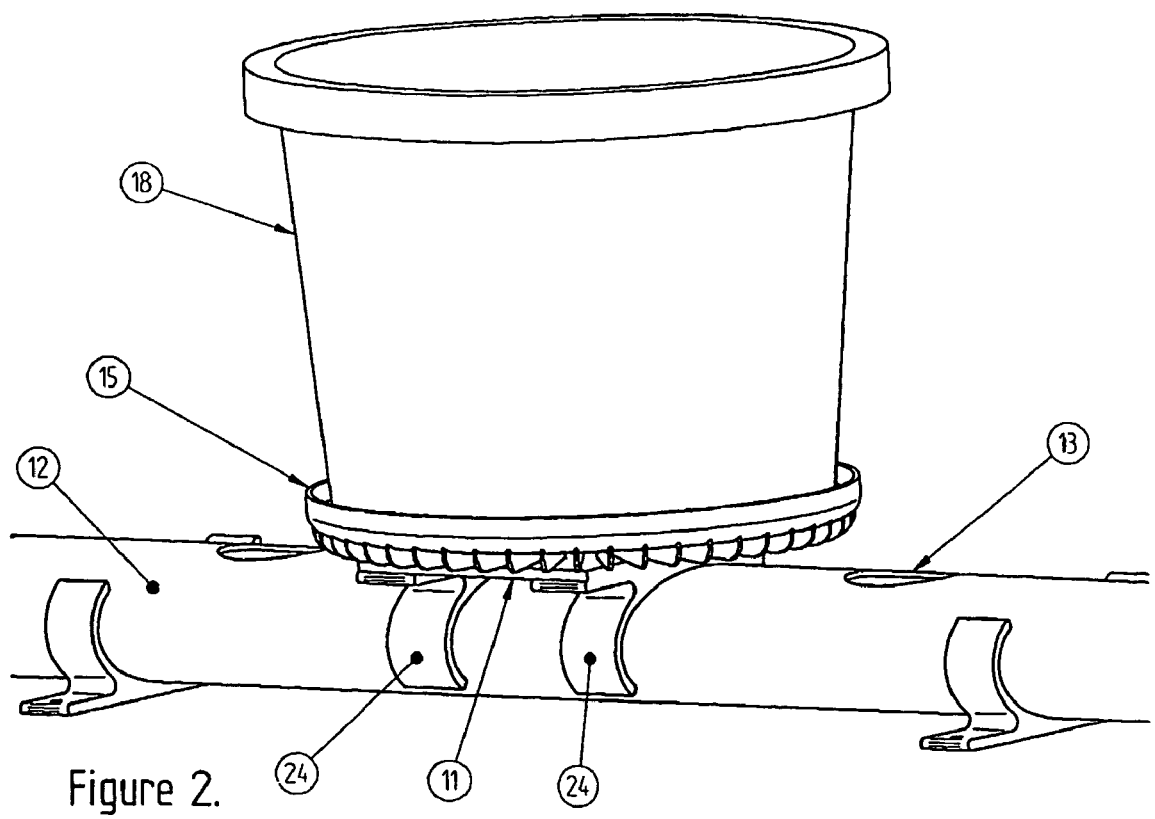
FIG. 2. Illustrates the attachment of FIG. 1 attached to a hydroponic conduit.

Referring to FIG. 2, a plant container 18 can be placed on top of drainage tray 14. Any water that passes out of plant container 18 will be collected by the drainage tray and will flow across the tray and/or along the drainage grooves 17 and through central aperture 16.

Figure 5:
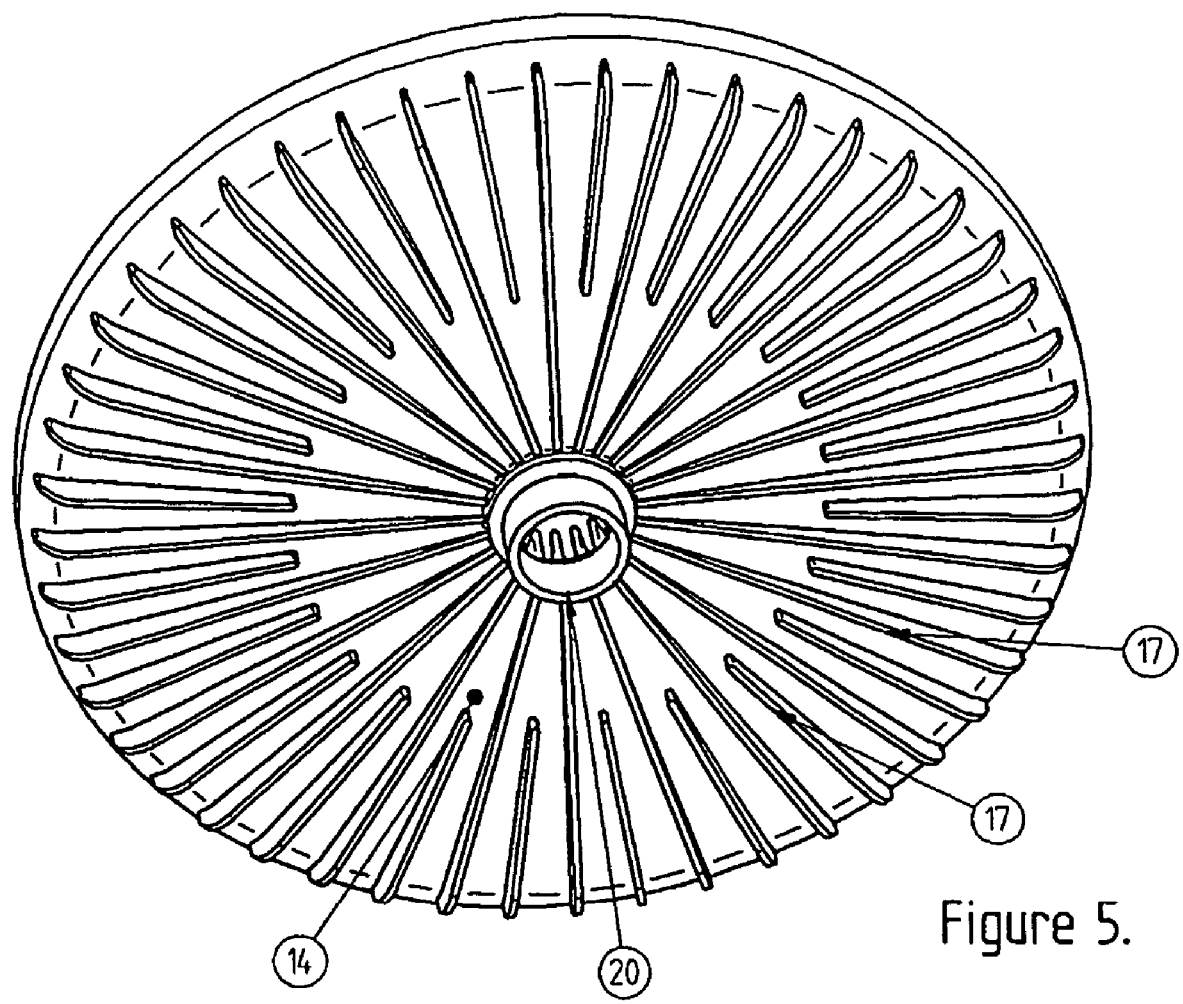
FIG. 5. Illustrates an underneath view of the support means/drainage means of FIG. 4.
Figure 6:
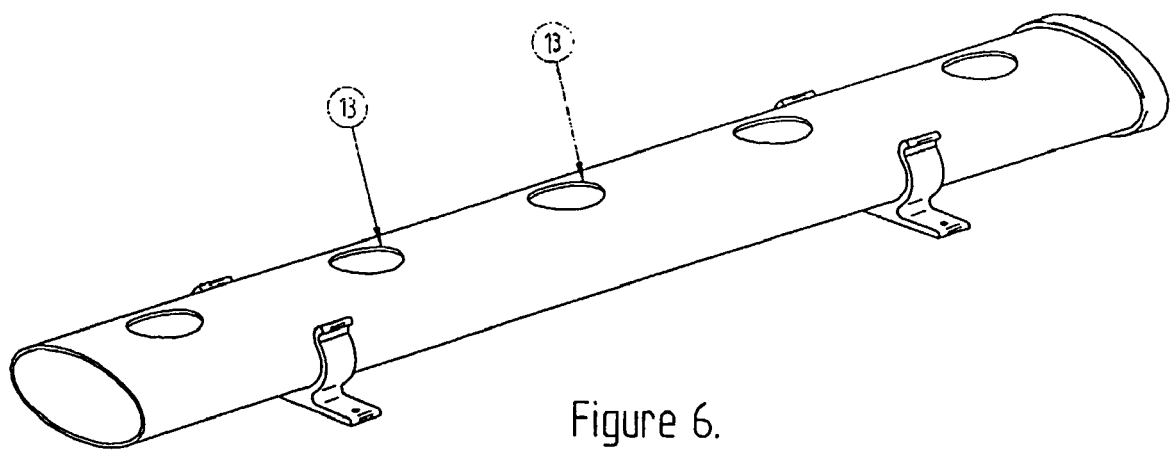
FIG. 6. Illustrates a part length of a typical known hydroponic conduit.

A short depending cylindrical spout 20 that is best illustrated in FIG. 5 defines central aperture 16. Spout 20 has a diameter of between 2-6 cm, and a length of between 2-10 cm. This can of course vary to suit.

Figure 3:
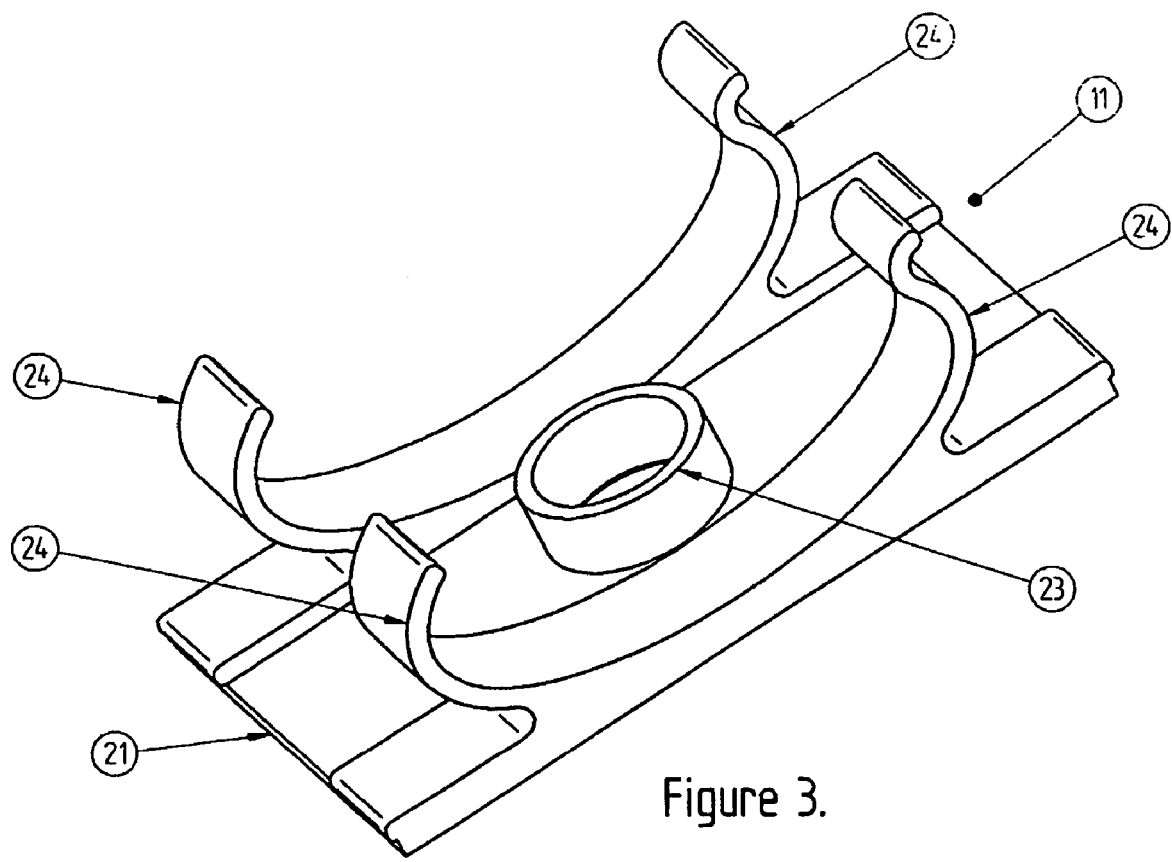
FIG. 3. Illustrates an underneath view of a second support means which forms part of the attachment according to the embodiment.

To provide stability to the drainage tray 14 when attached to hydroponic conduit 12, a second support means 11 is provided. Second support means 11 is illustrated in FIG. 1, and the underneath of second support means 11 is illustrated in FIG. 3. Second support means 11 comprises a substantially flat rectangular platform 21 that contains a central aperture 22 that is defined by a short depending collar 23 best illustrated in FIG. 3. Collar 23 is circular and has a diameter that is slightly larger than spout 20 on drainage tray 14. Thus, having spout 20 pass through collar 23 supports drainage tray 14. Having the bottom of drainage grooves 17, and/or the bottom wall of drainage tray 14 abutting against the top of platform 21 also support the drainage tray 14.

Another advantage with this arrangement is that drainage tray 14 can be simply lifted out from collar 23, and can also rotate about a vertical axis. For instance, a plant container placed on drainage tray 14 can be rotated manually to allow the plant to be pruned, inspected, and the like. As well, if a number of smaller plant containers are placed on a single drainage tray, tray 14 can be rotated manually to allow each plant container to be inspected.

Second support means 11 is attached to conduit 12 via a pair of spaced apart clips 24 which are best illustrated in FIG. 3 and FIG. 2. Clips 24 allow second support means 11 to be press-fitted to the outside wall of conduit 12. Also, the second support means can be simply removed by pulling the clips free from the outside wall of conduit 12.

Collar 23 is designed to pass through an opening 13 in conduit 12. The length of collar 23 should be such that while it passes through opening 13, it does not abut against the opposite wall of conduit 12 thereby preventing proper flow of water through collar 23 and along conduit 12.

Figure 7:
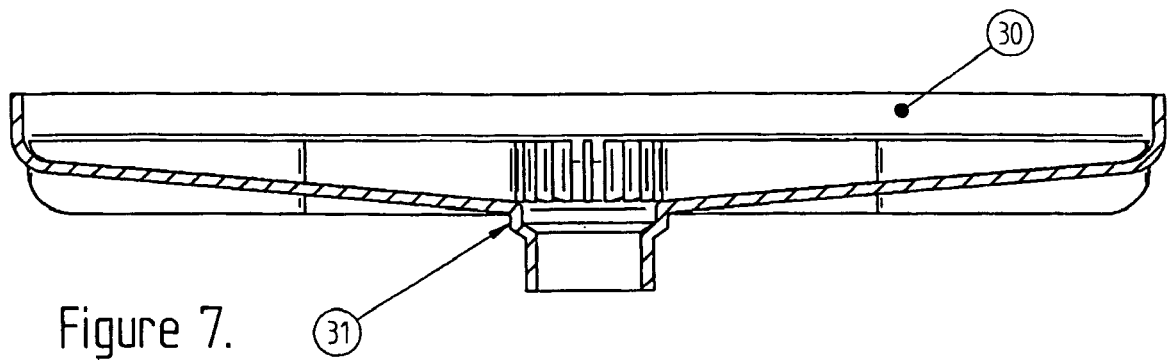
FIG. 7. Illustrates a drainage tray according to a second embodiment and which allows several trays to nest into each other.
Figure 8:
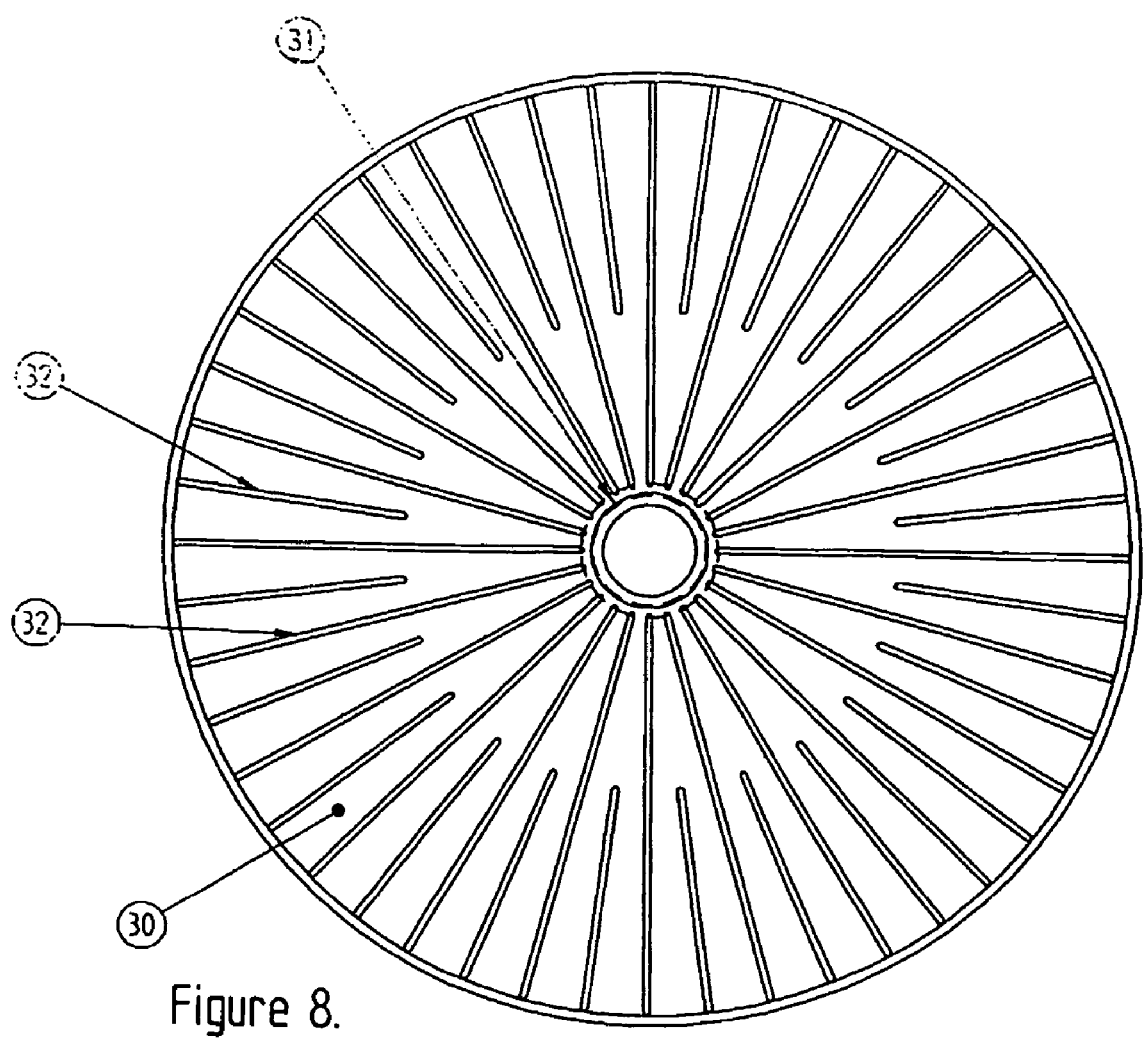
FIG. 8. Illustrates the tray of FIG. 7 in plan view and illustrating raised ribs on which the pot/bag can sit.

Referring to FIG. 7, there is illustrated a section view of a drainage tray 30. Drainage tray 30 has a lower integrally formed collar portion 31 which has a stepped configuration. This allows a number of drainage trays to be stacked with the collar of one drainage tray passing partially into the collar of a below drainage tray. Referring to FIG. 8, there is illustrated a plan view of the drainage tray illustrated in FIG. 7 and particularly illustrating a plurality of radially extending ribs 32. A plant pot/bag sits on top of the ribs and the ribs provide a small spacing between the bottom of the pot/bag and the surface of the drainage tray to allow water to drain through the collar.

In use, an existing hydroponic system can be modified to support plant containers by attaching one or more of the attachment means to the hydroponic conduit. The hydroponic conduit functions extremely well to retrieve waste water for recirculation, purification, or safe disposal. The attachment supports a plant container and ensures that any water drainage from the plant container drains into the hydroponic conduit and not somewhere else.

It should be appreciated that various other changes and modifications can be made to the embodiment described without departing from the spirit and scope of the invention.

The invention claimed is:

1. A hydroponic system comprising
at least one elongate hydroponic conduit having an at least partially rigid wall having a plurality of openings therein, at least some of the openings having plants restrained in the openings for hydroponic growth,
at least one pot stand attached to the at least one hydroponic conduit, the at least one pot stand having
a support tray to support a plant or plant container containing soil above and outside the at least one conduit, the support tray including drainage means adapted to collect drainage liquid passing out of the plant or plant container and a drain spout; and
at least one attachment means to attach the support tray to the at least one hydroponic conduit, the at least one attachment means having an opening therethrough to engage the drain spout of the support tray and to direct drainage liquid into the at least one hydroponic conduit, whereby liquid used to hydrate the plant on the support tray drains through the plant and into the at least one hydroponic conduit for use by the hydroponic system, wherein the attachment means includes a platform, the platform being provided with an opening through which the drain spout can pass, and at least one attachment clip to attach the attachment means to the at least one hydroponic conduit.

2. The hydroponic system as claimed in claim 1, wherein the support tray comprises a drainage tray adapted to support the plant container.

3. The hydroponic system as claimed in claim 2, wherein the drainage means comprises part of the drainage tray.

4. The hydroponic system as claimed in claim 3, wherein the drainage means comprises at least one projection extending from the drainage tray and adapted to support the plant container thereby allowing water to pass between the bottom of the plant container and the drainage tray.

5. The hydroponic system as claimed in claim 3, wherein the drainage means comprises at least one drainage recess in the drainage tray to allow water to pass along the drainage tray.

6. The hydroponic system as claimed in claim 2, wherein the drainage tray is provided with a drain opening.

7. The hydroponic system as claimed in claim 6, wherein the drain opening includes a collar on a bottom wall of the drainage tray, the collar adapted to pass into an opening in the at least one hydroponic conduit to allow water to drain from the drainage tray into the at least one hydroponic conduit.

8. A hydroponic system comprising
at least one elongate hydroponic conduit having an at least partially rigid wall having a plurality of opening therein, at least some of the opening having plants restrained in the openings for hydroponic growth,
at least one pot stand attached to the at least one hydroponic conduit, the at least one pot stand having
a support tray to support a plant or plant container containing soil above and outside the at least one conduit, the support tray including drainage means adapted to collect drainage liquid passing out of the plant or plant container and a drain spout; and
at least one attachment means to attach the support tray to the at least one hydroponic conduit, the at least one attachment means having an opening therethrough to engage the drain spout of the support tray and to direct drainage liquid into the at least one hydroponic conduit, whereby liquid used to hydrate the plant on the support tray drains through the plant and into the at least one hydroponic conduit for use by the hydroponic system, wherein the support tray comprises a circular plate having a top wall and a bottom wall and formed with a peripheral rim, the plate being dish shaped and having a central aperture, at least one radially extending rib extending from the top wall and on which the plant container is supported in use, the drain spout comprising an integrally formed collar depending from the bottom wall and extending about the central aperture to drain water from the circular plate.

9. The hydroponic system as claimed in claim 1 including more than one pot stand attachment wherein the at least one hydroponic conduit includes a plurality of openings spaced over its length and a pot stand attachment is provided for more than one of the openings.

10. The hydroponic system as claimed in claim 1 wherein the attachment means is mounted to the at least one hydroponic conduit such that the drain spout is engaged by the opening of the platform for support and a lower portion of the drain spout is located at least partially in one of the openings of the at least one hydroponic conduit.

* * * * *